(12) United States Patent
Sato

(10) Patent No.: US 6,246,780 B1
(45) Date of Patent: *Jun. 12, 2001

(54) MOTION DETECTION OF AN INPUT IMAGE SIGNAL DURING A CURRENT PERIOD WITH RESPECT TO A RESTORED IMAGE SIGNAL IN A PREVIOUS PERIOD

(75) Inventor: Makoto Sato, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/687,185

(22) Filed: Jul. 25, 1996

(30) Foreign Application Priority Data

Jul. 31, 1995 (JP) .................................. 7-194941
Jul. 12, 1996 (JP) .................................. 8-183826

(51) Int. Cl.[7] ........................................ G06K 9/00
(52) U.S. Cl. ................. 382/107; 358/521; 382/236; 382/275
(58) Field of Search .................. 382/236, 237–238, 382/264, 107, 299, 251, 275; 348/402, 407, 413; 345/141, 87; 358/521

(56) References Cited

U.S. PATENT DOCUMENTS

| 4,032,969 | * | 6/1977 | Ueda | 358/52 |
|---|---|---|---|---|
| 4,797,945 | | 1/1989 | Suzuki et al. | 382/253 |
| 4,821,115 | * | 4/1989 | Matsushima et al. | 358/500 |
| 4,918,523 | * | 4/1990 | Simon et al. | 358/133 |
| 5,065,446 | | 11/1991 | Suzuki et al. | 382/253 |
| 5,122,873 | * | 6/1992 | Golin | 358/133 |
| 5,144,456 | * | 9/1992 | Sakano | 358/443 |
| 5,245,419 | * | 9/1993 | Gu | 358/521 |
| 5,253,340 | * | 10/1993 | Inoue | 395/163 |
| 5,278,667 | * | 1/1994 | Takahashi | 358/445 |
| 5,278,670 | * | 1/1994 | Eschbach | 358/453 |
| 5,298,893 | * | 3/1994 | Sekine | 345/63 |
| 5,515,180 | * | 5/1996 | Maeda et al. | 358/458 |
| 5,528,704 | * | 6/1996 | Parker et al. | 382/299 |
| 5,553,166 | * | 9/1996 | Kakutani | 382/252 |
| 5,668,890 | * | 9/1997 | Winkelman | 382/167 |
| 5,760,922 | * | 6/1998 | Kojima | 358/464 |

FOREIGN PATENT DOCUMENTS

| 0608053 | 7/1994 | (EP) . |
|---|---|---|
| 0608056 | 7/1994 | (EP) . |

* cited by examiner

*Primary Examiner*—Jay Patel
(74) *Attorney, Agent, or Firm*—Fitzpatrick, Cella, Harper & Scinto

(57) ABSTRACT

An image processor in which an input image signal having a number $L_1$ of gradation levels is converted into an image signal having a number $L_2$ ($<L_1$) of gradation levels, and the converted image signal is stored. The stored image signal is used to restore the original image signal, and motion of an image is detected on the basis of an image signal input in the current period and the restored image signal in the previous period.

12 Claims, 7 Drawing Sheets

MOTION DETECTION OF AN INPUT IMAGE SIGNAL DURING A CURRENT PERIOD WITH RESPECT TO A RESTORED IMAGE SIGNAL IN A PREVIOUS PERIOD

BACKGROUND OF THE INVENTION

1. Field of the Invention

The present invention relates to an image processing method and apparatus and, more particularly, to motion detection processing of an input image signal.

2. Related Background Art

Along with recent trends toward smaller, multimedia-oriented computers, display devices in computers have remarkably advanced. As display devices, liquid crystal display devices have been popularly used. As one of such display devices, a display device using a ferroelectric liquid crystal display device (to be abbreviated as an FLCD hereinafter) is known.

As a feature of the FLCD, a high-definition display device with a large screen is achieved. However, since a liquid crystal element itself is a binary device which cannot change the transmittance of light in an analog manner, pseudo gradation levels are expressed by combinations of ON and OFF dots upon displaying a full-color image or the like. That is, digital halftone processing must be performed to reproduce a halftone image.

Since it is difficult to display data on a large screen at a rate of 30 frames per second or more, only a portion in which motion is detected in a frame must be rewritten by utilizing the memory characteristics as the feature of the FLCD. For this purpose, a portion including motion in an image must be detected. Conventionally, the following method of detecting motion is used.

FIG. 1 is a block diagram of an image processing apparatus for an FLCD, which is adapted to display an analog image signal supplied from a computer on a FLCD and includes a motion detection circuit.

Referring to FIG. 1, an analog image signal output from a computer (not shown) is converted by an A/D converter 1 into a digital signal having a predetermined number of gradation levels, e.g., a 24-bit digital signal (8 bits for each of R, G, and B colors).

A gradation conversion circuit 2 converts the R, G, and B digital signals output from the A/D converter 1 into a digital signal having a number of resolution levels that can be displayed by a display device 7, e.g., a 3-bit digital signal (1 bit for each of R, G, and B colors) by known digital halftone processing such as the dither method, the error diffusion method, or the like. The digital signal output from the gradation conversion circuit 2 is stored in a binary frame memory 5.

In additon, the digital signal output from the A/D converter 1 is input to a motion detector 9. The motion detection 9 is described in detail below.

FIG. 2 is a block diagram showing the motion detector 9.

Referring to FIG. 2, the image signal input from the A/D converter 1 is stored in a line buffer 901 having a predetermined capacity for K pixels. As shown in FIG. 2, the line buffer is designed to store K pixels, and pixel data stored in the line buffer are subjected to weighted mean processing given by equation (1) below via a multiplier 902, an adder 903, and an accumulator 904 so as to be converted into a feature value $S_t$ corresponding to a set of K pixels:

$$S_t = \sum_{i=0}^{K-1} w_i p_i \qquad (1)$$

where $w_i$ is a weighting coefficient determined in advance by a predetermined method, and an image which is being processed is assumed to belong to the t-th frame. Subsequently, the calculated feature amount $S_t$ is compared with a feature amount $S_{t-1}$ which was calculated based on image data of the previous frame and was stored in a feature amount memory 10 in FIG. 1, by a comparison controller 905. In this case, a difference $\Delta S$ as the comparison result is compared with a predetermined threshold value T, and if the following inequality holds, it is determined that motion is detected from the corresponding line portion, and the line address of the pixels at that time is output to a frame memory control circuit 4 (FIG. 1):

$$\Delta S = S_t - S_{t-1} > T \qquad (2)$$

Note that the line address is the start address of K successive pixels.

The above-mentioned motion detection processing is performed in units of R, G, and B colors, and the calculated feature amount is newly stored in the feature amount memory 10. The frame memory control circuit 4 outputs data of the motion-detected line from the digital signal (1 bit for each of R, G, and B colors) stored in the binary frame memory 5 on the basis of the address information output from the motion detector 9. With the above-mentioned processing, continuous analog image signals are converted into signals having a predetermined number of gradation levels, and motion between adjacent frames is detected to partially rewrite an image to be displayed, thus realizing an image display operation in real time.

However, in the above-mentioned prior art, in order to attain motion detection, the feature amount obtained from image data of the previous frame must be stored in the feature amount memory 10.

In particular, since the screen size has been increasing in recent years, the capacity required for the feature amount memory is also increasing, resulting in an increase in cost of the apparatus.

Upon execution of motion detection, binary pixel data may be directly compared with each other without calculating any feature amount. However, in this case, if an image signal includes noise from the transmission route, a binary image bit is easily inverted, resulting in a detection error.

SUMMARY OF THE INVENTION

The present invention has been made in consideration of the above situation, and has as its object to provide an image processing method and apparatus, which can reduce the capacity of a feature amount memory required for motion detection as much as possible so as to attain a cost reduction of the system, and rarely causes a detection error due to noise.

In order to achieve the above object, according to one preferred embodiment of the present invention, an image processing apparatus (method) comprises conversion means (step) for converting an input image signal having a number $L_1$ of gradation levels into an image signal having a number $L_2$ ($<L_1$) of gradation levels, storage means (step) for storing the image signal converted by the conversion means (step), restoration means (step) for restoring the image signal stored in the storage means (step), and detection means (step) for detecting a motion of an image on the basis of the image signal input during a current period and the image signal in a previous period, which is restored by the restoration means (step).

Other objects, features and advantages of the invention will become apparent form the following detailed description taken in conjunction with the accompanying drawings.

DETAILED DESCRIPTION OF THE PREFERRED EMBODIMENTS

The preferred embodiments of the present invention are described hereinafter.

Figure 1:
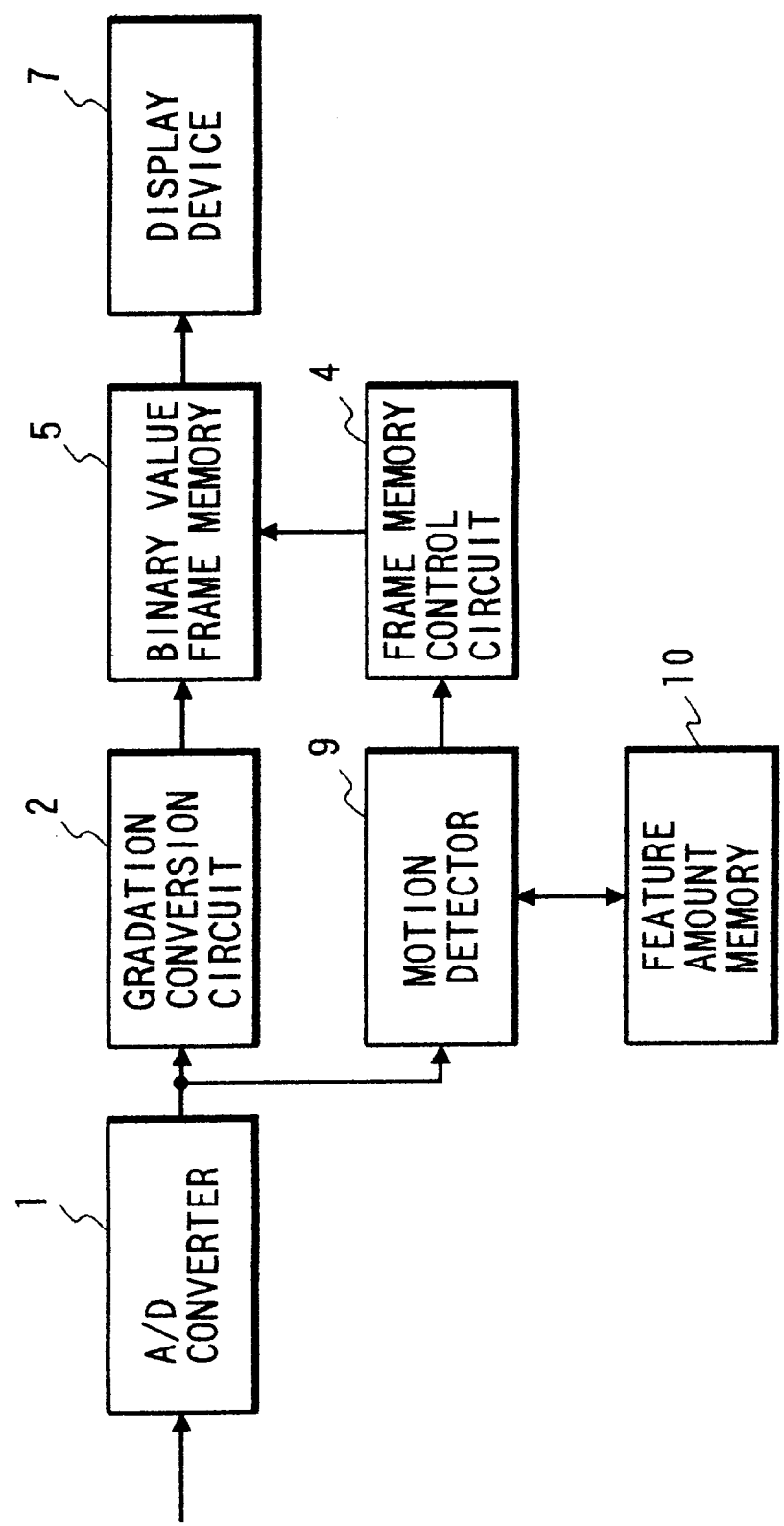
FIG. 1 is a block diagram showing a conventional image processing apparatus.
Figure 2:
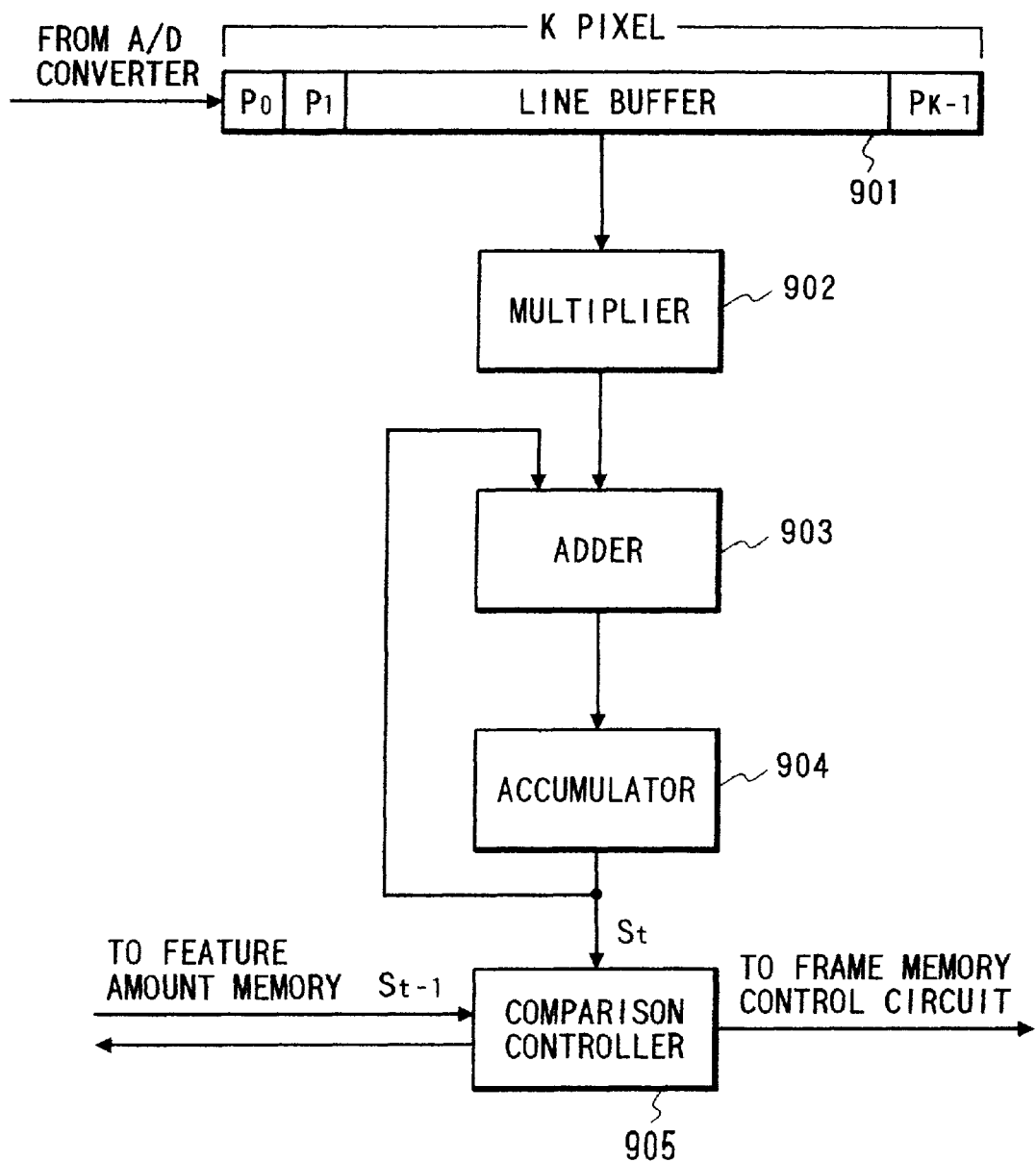
FIG. 2 is a block diagram showing a motion detector 9 shown in FIG. 1.
Figure 3:
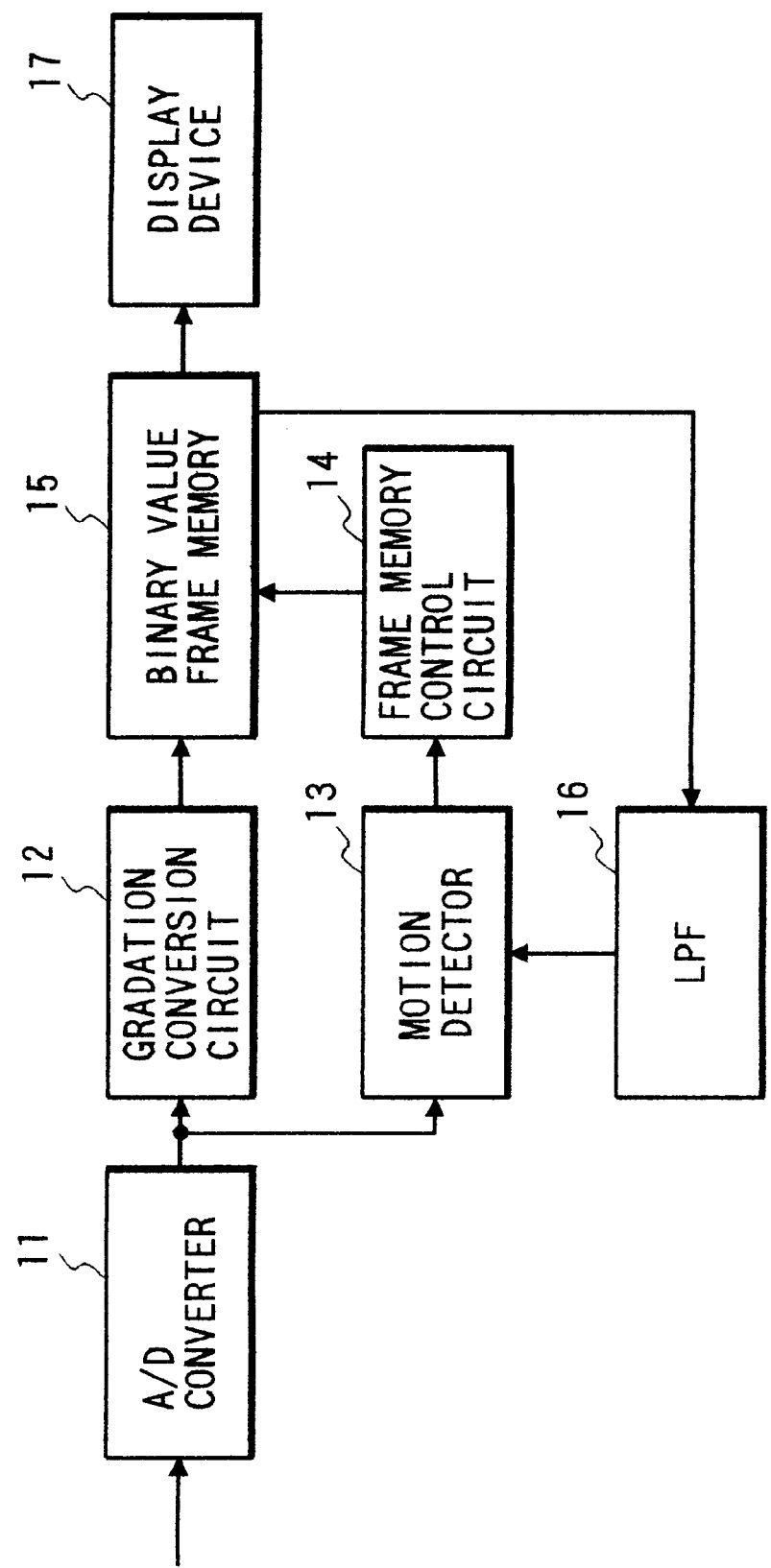
FIG. 3 is a block diagram showing an image processing apparatus according to the first embodiment of the present invention.

FIG. 3 is a block diagram showing an image processing apparatus according to the first embodiment of the present invention.

Referring to FIG. 3, the apparatus comprises an A/D converter 11, a gradation conversion circuit 12, a motion detector 13, a frame memory control circuit 14, a binary frame memory 15, a display device 17, and a filter (to be referred to as an LPF hereinafter) 16 having low-pass characteristics with coefficients shown in FIG. 4 and equation (5) shown later.

The operation of the image processing apparatus with the arrangement shown in FIG. 3 is explained below.

An analog image signal output from a computer (not shown) is converted by the A/D converter 11 into a digital signal having a predetermined number of gradation levels, e.g., a 24-bit digital signal (8 bits for each of R, G, and B colors). The gradation conversion circuit 12 converts the digital signal output from the A/D converter 11 into a digital signal having a number of gradation levels that are displayed by the display device 17, e.g., a 3-bit digital signal (1 bit for each of R, G, and B colors) by the dither method. The digital signal output from the gradation conversion circuit 12 is stored in the binary frame memory 15.

In addition, the digital signal output from the A/D converter 11 is input to the motion detector 13. The motion detector 13 is described in detail below with reference to FIG. 4.

Figure 4:
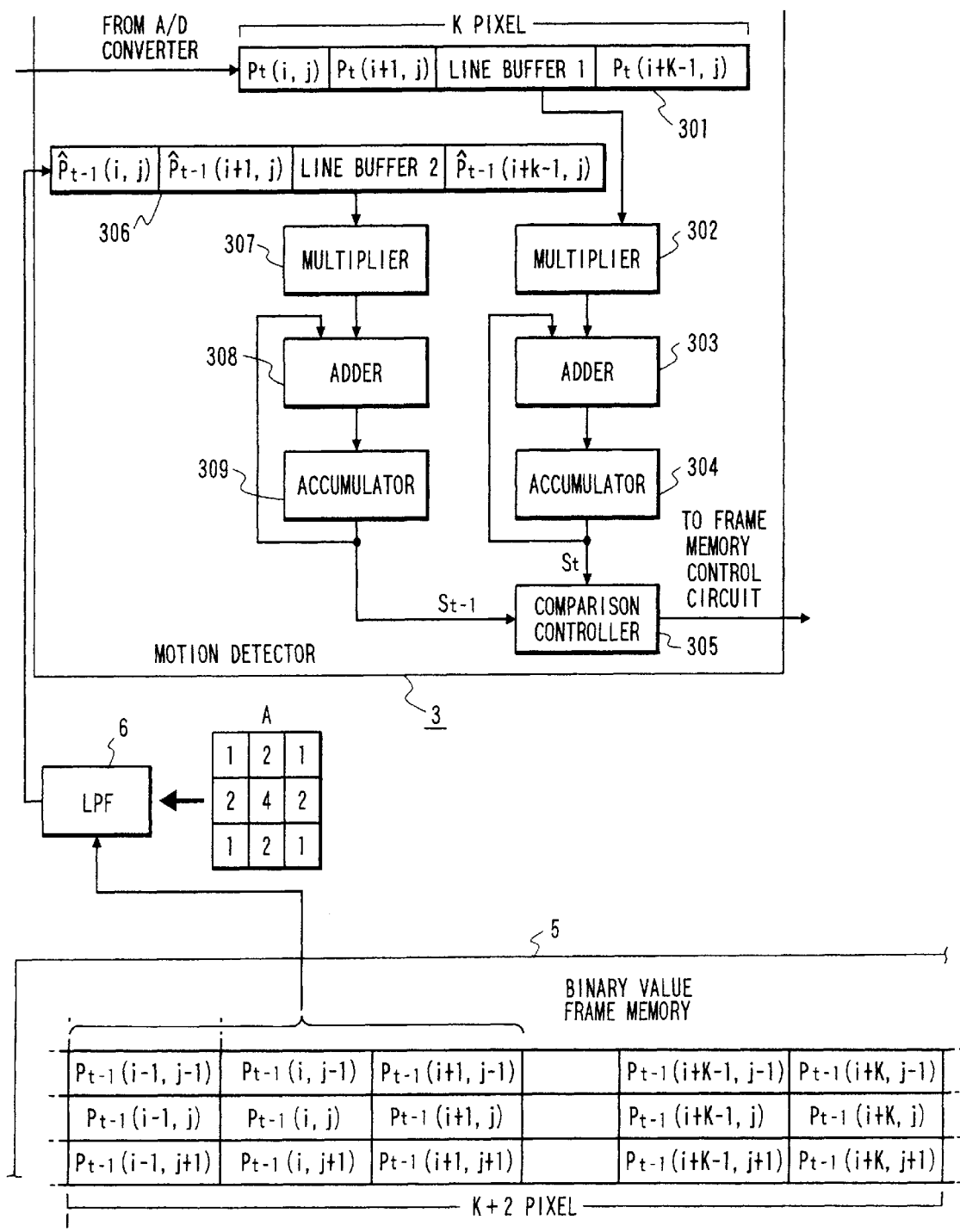
FIG. 4 is a detailed block diagram for explaining the processing of a motion detector 13 shown in FIG. 3.

Referring to FIG. 4, the image signal output from the A/D converter 11 is stored in a line buffer 301 having a predetermined capacity for K pixels. As shown in FIG. 4, the line buffer 301 is designed to store K pixels, and in this case, K pixels starting from the pixel at a coordinate position (i, j) in the scanning direction in the t-th frame are input to the line buffer 301. The pixel data stored in the line buffer 301 are subjected to weighted mean processing given by equation (3) below via a multiplier 302, an adder 303, and an accumulator 304 so as to be converted into a feature value $S_t$ corresponding to a set of K pixels:

$$S_t = \sum_{k=0}^{K-1} w_k P_t(i+k, j) \qquad (3)$$

where $W_k$ is a coefficient determined in advance by a predetermined method, and $P_t(i, j)$ indicates the pixel at a coordinate position (i, j) in an image of the t-th frame. Also binary image data of the (t−1)-th frame stored in the binary frame memory 5, and pixel data for a total of nine neighboring pixels including the pixel at the position (i, j) as the center are fetched by the LPF 16, and are subjected to a calculation given by equation (4) below so as to be converted into a mean value by weighted mean processing among surrounding pixels:

$$\hat{P}_{t-1}(i, j) = \frac{\sum_{m,n=-1}^{1} A_{mn} P_{t-1}(i+m, j+n)}{\sum_{m,n=-1}^{1} A_{mn}} \qquad (4)$$

where $A_{mn}$ is a coefficient to be multiplied with each pixel, and consists of values given by equation (5) below:

$$A = \begin{pmatrix} A_{-1-1} & A_{0-1} & A_{1-1} \\ A_{-10} & A_{00} & A_{10} \\ A_{-11} & A_{01} & A_{11} \end{pmatrix} = \begin{pmatrix} 1 & 2 & 1 \\ 2 & 4 & 2 \\ 1 & 2 & 1 \end{pmatrix} \qquad (5)$$

The mean value $\hat{P}_{t-1}(i, j)$ is a restored value $P_{t-1}(i, j)$ obtained by the weighted mean processing of surrounding pixels from the gradation-converted value.

The obtained restored value $\hat{P}_{t-1}(i, j)$ is set in another line buffer 306 arranged in the motion detector 13. Subsequently, the same processing as described above is performed for K binary pixel data and a mean value of the K pixels is set in the line buffer 306. The pixel data stored in the line buffer 306 are subjected to weighted mean processing given by equation (6) below via a multiplier 307, an adder 308, and an accumulator 309, and are converted into a feature value $S_{t-1}$ corresponding to a set of K pixels:

$$S_{t-1} = \sum_{k=0}^{K-1} w_k \hat{P}_{t-1}(i+k, j) \qquad (6)$$

where $W_k$ is the same weighting coefficient as that used upon calculating $S_t$ above. The obtained two feature amounts $S_t$ and $S_{t-1}$ are input to a comparison controller 305. The comparison controller 305 compares the two values, and then compares a difference ΔS as the comparison result with a predetermined threshold value T. If the following inequality holds, the controller 305 determines that motion is detected in the corresponding line portion, and outputs the line address of the pixels at that time to the frame memory control circuit 14 shown in FIG. 3:

$$\Delta S = S_t - S_{t-1} > T \qquad (7)$$

Note that the line address is the start address of K successive pixels. The above-mentioned motion detection processing is performed in units of R, G, and B colors.

The frame memory control circuit 14 controls the binary frame memory 15 to output data of the motion-detected line to the display device 17 on the basis of the address information output from the motion detector 13. With the above-mentioned processing, continuous analog image signals are converted into signals having a predetermined number of gradation levels, and motion between adjacent frames is detected to partially rewrite an image to be displayed, thus realizing an image display operation in real time.

Figure 5:
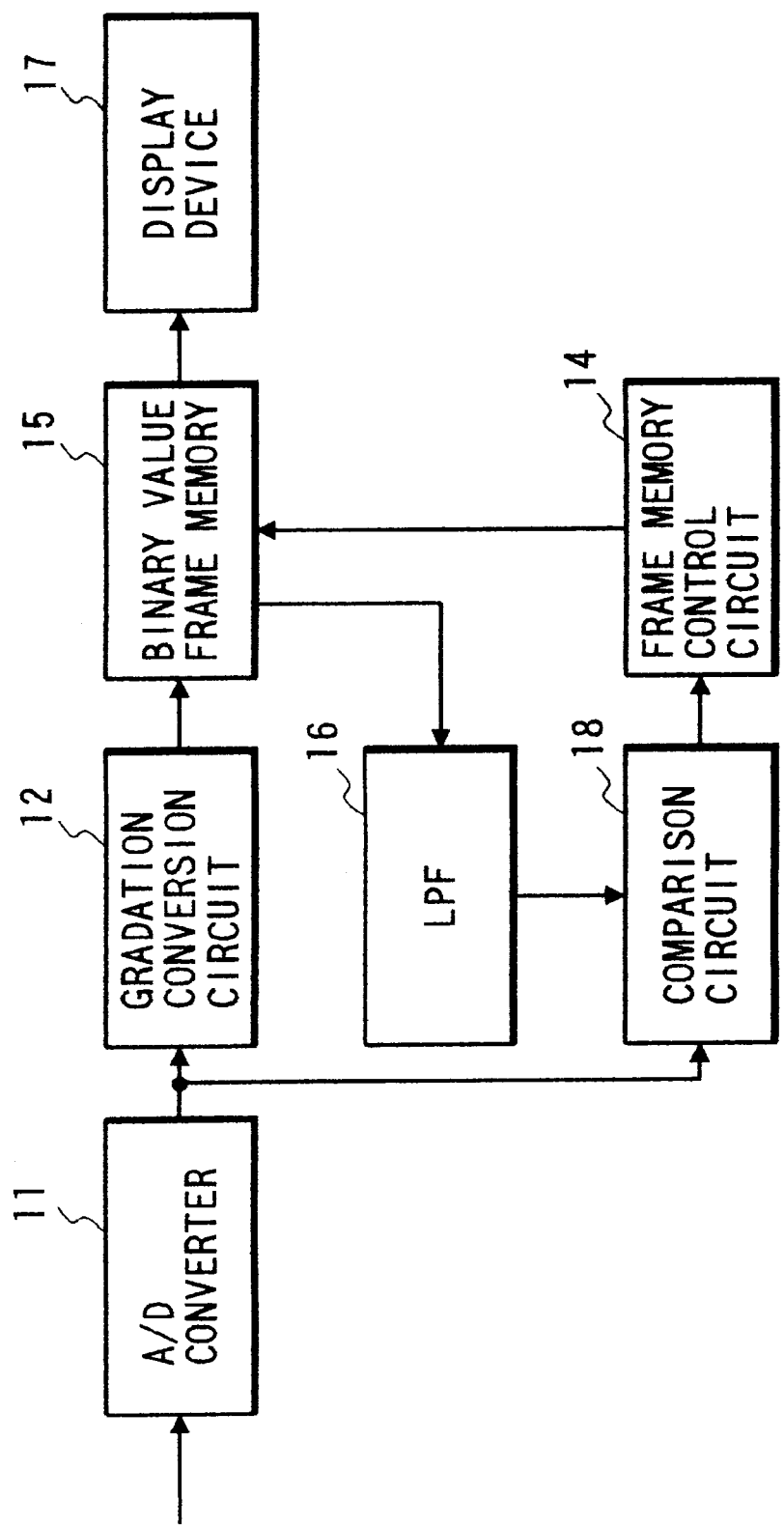
FIG. 5 is a block diagram showing an image processing apparatus according to the second embodiment of the present invention.

FIG. 5 is a block diagram showing an image processing apparatus according to the second embodiment of the present invention. Note that the same reference numerals in FIG. 5 denote the same parts as in FIG. 3, and a detailed description thereof is omitted.

The apparatus shown in FIG. 5 includes a comparison circuit 18.

The operation of the image processing apparatus with the arrangement shown in FIG. 5 is described below.

An analog image signal output from a computer (not shown) is converted by the A/D converter 11 into a digital signal u having a predetermined number of gradation levels, e.g., 256 gradation levels per color. The signal u is converted into a signal having the number of gradation levels that can be displayed by the display device 17, e.g., two gradation levels per color, by the gradation conversion circuit 12, and the converted signal is output to the binary frame memory 15.

Note that the display device 17 comprises a FLCD, and only a portion including a motion in an image for one frame as compared to the previous frame is output from the binary frame memory 15 under the control of the frame memory control circuit 14. With this arrangement, motion between adjacent frames is detected by the comparison circuit 18.

The gradation conversion circuit 12 comprises a cellular neural network in which neurons are locally coupled.

Upon converting an image having a size of M×N into that having two gradation levels, the operation of the cellular neural network is defined as:

$$x_{ij} = \sum_{mn} A_{ijmn} y_{mn}(t) + \sum_{mn} B_{ijmn} u_{mn}(t) + S \quad (8)$$

$$y_{ij}(t+1) = f(x_{ij}(t))$$

$$f(x) = \begin{cases} 1 & \text{for } x \geq 0 \\ -1 & \text{for } x < 0 \end{cases}$$

where $A_{ijmn}$ and $B_{ijmn}$ are weights to be multiplied with a connection from the neuron at a position (m, n) to the neuron at a position (i, j). Also, $u_{mn}$ and $Y_{mn}$ are respectively input and output image data at the position (m, n). The cellular neural network generates an output image that minimizes a distortion function set as follows by the operation given by equations (8) above.

A distortion function dist(yi, ui) is defined as equation (9) below from a square error of the filtering result of the i-th gradation-converted output image $y_i$ using a predetermined filter H and the input image $u_i$ before conversion:

$$\text{dist}(y_i, u_i) = \frac{1}{MN}(Hy_i - u_i)^T(Hy_i - u_i) \quad (9)$$

By comparing this distortion function and the energy function of the neural network, weights as the parameters of the network are set as follows:

$A = -H^T H + \text{diag}\{H^T H\}$ $B = X$ $S = 0 \quad (10)$

When the network operates based on these parameters and an output image is obtained, the value of the distortion function is minimized.

The operation of this embodiment is described below with reference to FIG. 5.

A digital image signal $u^n$ of the n-th frame input from the A/D converter 11 is converted into an image $y^n$ by the operation of the neural network given by equations (11) below, and the converted image is output:

$$x_{ij}^n(t) = \sum_{mn} A_{ijmn} y_{mn}^n(t) + \sum_{mn} B_{ijmn} u_{mn}^n(t) + S \quad (11)$$

$$y_{ij}^n(t+1) = f(x_{ij}^n(t))$$

$$f(x) = \begin{cases} 1 & \text{for } x \geq 0 \\ -1 & \text{for } x < 0 \end{cases}$$

where $u^n_{ij}(t)$ and $y^n_{ij}(t)$ are the values of the input image signal $u^n$ and the output image signal $y^n$ corresponding to the position (i, j) on the screen in the t-th operation of the neural network. Also, f is a nonlinear function determined by the number of gradation levels that can be displayed by the display device 17, and $A_{ijmn}$ and $B_{ijmn}$ are filter coefficients for a spatial filter operation applied to the $y^n_{ij}$ and $u^n_{ij}$, which coefficients are determined in advance by equations (10) above. Note that the filter H is defined by a two-dimension Gaussian distribution which resembles human visual characteristics.

Figure 6:
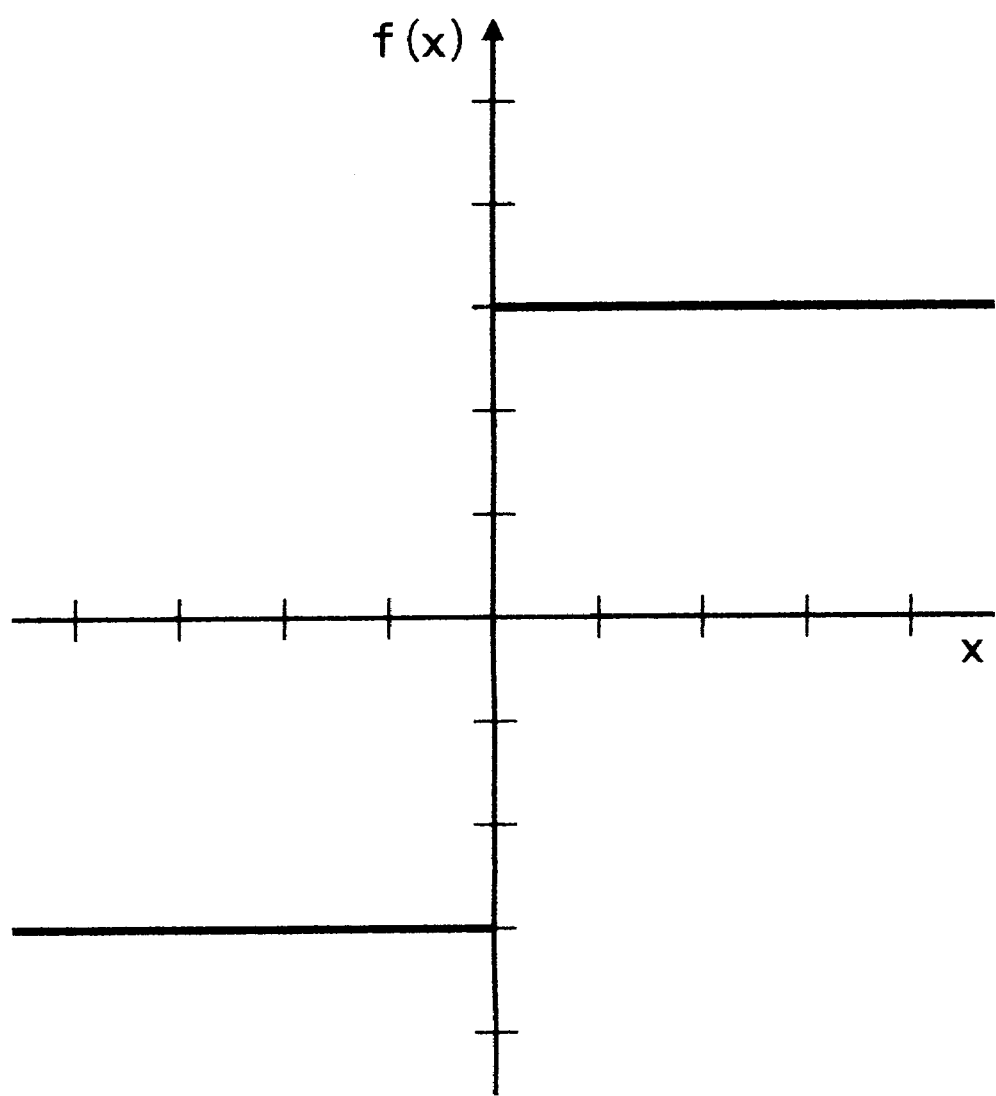
FIG. 6 is a graph showing an example of a nonlinear function in a gradation conversion circuit shown in FIG. 5.

FIG. 6 shows an example of the nonlinear function f. The number of levels of an output with respect to an input is the same as the number of gradation levels that can be displayed by the display device 17, and the output corresponds to image data having the number of gradation levels that can be displayed by the display device. In FIG. 6, the number of output gradation levels is 2, and the display device 17 is a binary device which assumes either an ON or OFF state.

The gradation conversion circuit 12 calculates output data $y^n(t)$ using equations (11), and calculates a sum total of differences between repetitive portions of the calculated image signals in one frame. When the sum total becomes equal to or smaller than a predetermined value $T_s$, as indicated by inequality (12) below, the circuit 12 outputs the output image signal $y^n(t)$ at that time as a gradation-converted image $y^n$ to the binary frame memory 15.

$$\sum_{ij} |y_{ij}^n(t) - y_{ij}^n(t-1)| < T_s \quad (12)$$

Between the image signal $y^n$ output at that time and the input image signal $u^n$, the distortion function given by equation (9) above is minimized by the operation of the cellular neural network.

Subsequently, an image signal of the next (n+1)-th frame is input, and is converted into a digital image signal $u^{n+1}$ by the A/D converter 11 in the same manner as in the previous frame. Thereafter, the converted signal is input to the comparison circuit 18. On the other hand, the image $y^n$ of the previous frame stored in the frame memory is input to the LPF 16, and is converted as follows in accordance with equation (13) below:

$$\hat{u}^n = H u^n \quad (13)$$

$u^{n+1}$ and $\hat{u}^n$ are input to the comparison circuit 18 in units of lines, and motion between two frames in the corresponding line is detected on the basis of these data.

Figure 7:
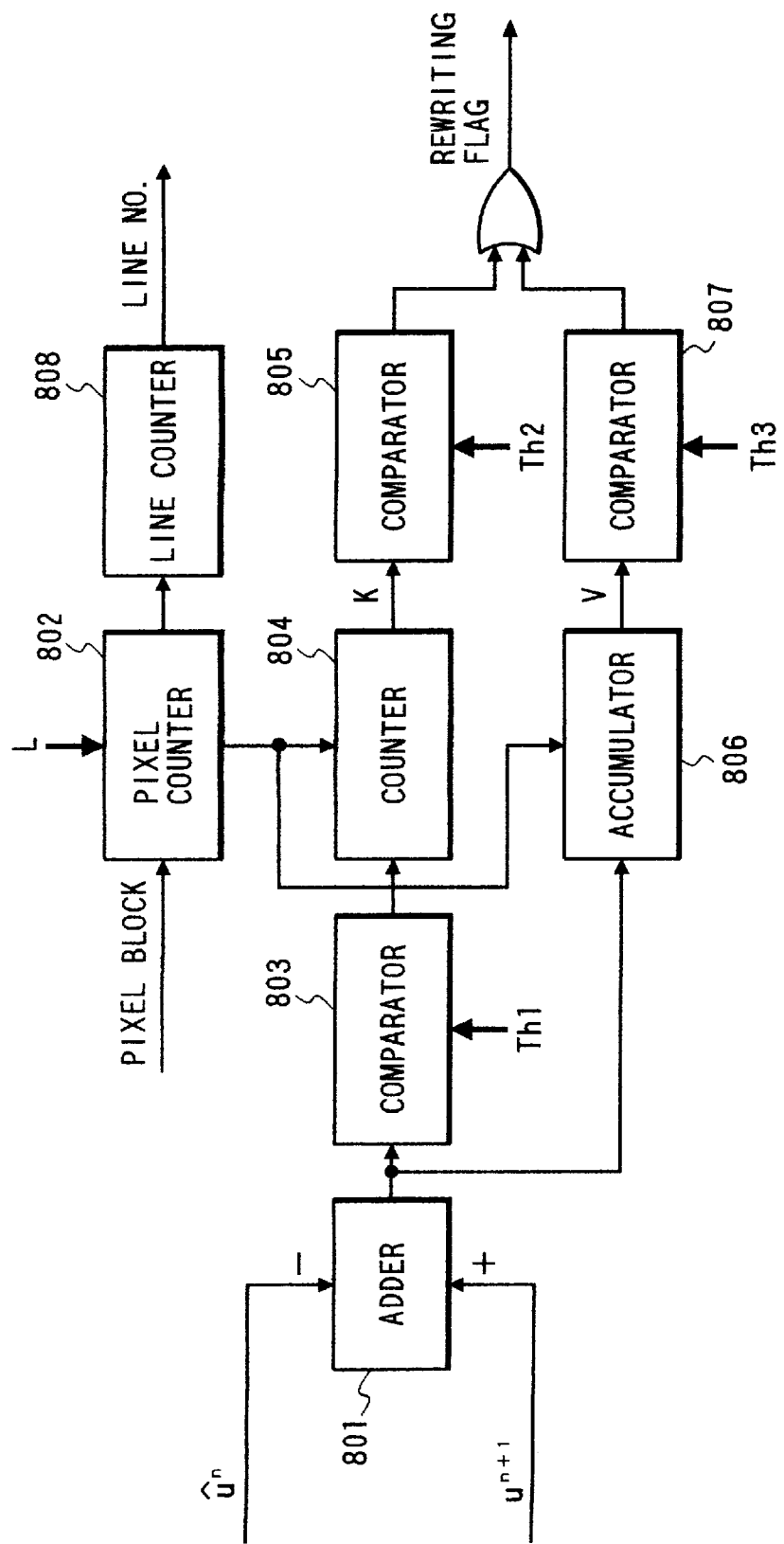
FIG. 7 is a block diagram showing the arrangement of the comparison circuit 18 shown in FIG. 5.

FIG. 7 is a block diagram showing the arrangement of the comparison circuit 18.

$u^{n+1}$ and $\hat{u}^n$ input to the comparison circuit 18 in units of lines are input to an adder 801 in units of $$d = \hat{u}_{ij}^n - u_{ij}^{n+1} \tag{14}$$

where $\hat{u}_{ij}^n$ and $u_{ij}^{n+1}$ are the i-th image data in the j-th line.

The difference d is input to a comparator 803, and is compared with a predetermined threshold value Th1. When d is larger than Th1, the comparator 803 outputs "1"; otherwise, the comparator 803 outputs "0". The comparator 803 supplies the output value to a counter 804.

A pixel counter 802 counts the number of input pixels, and outputs a reset signal to the counter 804 when the count value has exceeded a pre-set value L. Upon reception of the reset signal, the counter 804 outputs the number K of "1" data input so far, and clears its internal counter to zero. A comparator 805 receives the number K of input data, and compares the input value with a predetermined threshold value Th2. When K has exceeded Th2, the comparator 805 outputs "1"; otherwise, the comparator 805 outputs "0".

On the other hand, the difference d output from the adder 801 is also input to an accumulator 806. The accumulator 806 accumulates the input values d in units of pixels, and outputs an accumulated value V to a comparator 807 upon reception of a reset signal from the pixel counter 802. The comparator 807 compares the input value V with a predetermined threshold value Th3. When V has exceeded Th3, the comparator 807 outputs "1"; otherwise, the comparator 807 outputs "0". Finally, in the comparison circuit 18, an OR gate 809 ORs the results outputs from the comparators 805 and 807, and outputs the OR as a rewriting flag for the currently effective line. A line counter 808 counts a line number on the basis of the output from the pixel counter 802, and outputs the count value as the currently effective line No. data.

Referring to FIG. 5, the frame memory control circuit 14 controls the binary frame memory 15 to output data of a line to be output to the display device 17 on the basis of the rewriting flag and the line No. data received from the comparison circuit 18. In this manner, since the LPF processing is performed upon comparison, and data are compared using a combination of a plurality of threshold values, stable detection is guaranteed even when noise is superimposed on an input image.

Note that various changes and modifications of the present invention may be made within the spirit and principal feature of the invention.

In other words, the foregoing description of embodiments has been given for illustrative purpose only and is not to be construed as imposing any limitation in any respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus comprising:

a) input means for inputting a first image signal having a number L1 of gradation levels;

b) first conversion means for converting the first image signal into a second image signal having a number L2 (<L1) of gradation levels;

c) storage means for storing the second image signal;

d) second conversion means for converting the second image signal into a third image signal which is restored to an image signal as it was before a conversion processing by said first conversion means said first conversion means minimizes a predetermined distortion function upon converting the number of gradation levels;

e) detection means for detecting a motion of the first image signal input by said input means on a basis of the third image signal output from said second conversion means; and f) control means for reading out from said storage means the second image signal corresponding to the first image signal whose motion is detected by said detection means, and supplying the read-out second image signal to display means.

2. An apparatus according to claim 1, wherein said display means displays an image on a basis of the second image signal supplied by said control means.

3. An apparatus according to claim 2, wherein said display means comprises a ferroelectric liquid crystal display.

4. An apparatus according to claim 1, wherein said second conversion means performs filter processing having low-pass characteristics by performing a product-sum operation of a predetermined weighing value and the second image signal.

5. An apparatus according to claim 1, wherein said first conversion means minimizes a predetermined distortion function upon converting the number of gradation levels, said second conversion means converts the second image signal into the third image signal on a basis of a parameter of the distortion function, and said detection means detects a motion between successive frames by comparing the first image signal and the third image signal.

6. An apparatus according to claim 5, wherein the distortion function minimizes a square error between the first image signal subjected to the product-sum operation with a predetermined coefficient and the second image signal.

7. An apparatus according to claim 5, wherein said first conversion means comprises:

a) first product-sum operation means for performing product-sum operation processing of a plurality of pixels in a predetermined area of the first image signal and a predetermined input weighing value;

b) second product-sum operation means for performing product-sum operation processing of a plurality of pixels in a predetermined area of the second image signal and a predetermined output weight value; and c) nonlinear processing means for receiving operation results from said first and second product-sum operation means and determined output data on a basis of predetermined nonlinear characteristics.

8. An image processing apparatus comprising:

a) input means for inputting a first image signal having a number L1 of gradation levels;

b) first conversion means for converting the first image signal into a second image signal having a number L2 (<L1) of gradation levels:

c) storage means for storing the second image signal;

d) second conversion means for converting the second image signal into a third image signal having a number L1 of gradation levels;

e) detection means for detecting a motion of the first image signal of one picture on a basis of the third image signal of another picture; and f) output means for outputting the second image signal from said storage means in accordance with the output of said detection means, wherein
said first conversion means minimizes a predetermined distortion function upon converting the number of gradation levels,
said second conversion means converts the second image signal into the third image signal on a basis of a parameter of the distortion function, and
said detection means detects a motion between successive frames by comparing the first image signal and the third image signal.

9. An apparatus according to claim 8, wherein the distortion function minimizes a square error between the first image signal subjected to the product-sum operation with a predetermined coefficient and the second image signal.

10. An apparatus according to claim 8, wherein said first conversion means comprises:
a) first product-sum operation means for performing product-sum operation processing of a plurality of pixels in a predetermined area of the first image signal and a predetermined input weighing value;
b) second product-sum operation means for performing product-sum operation processing of a plurality of pixels in a predetermined area of the second image signal and a predetermined output weight value; and
c) nonlinear processing means for receiving operation results from said first and second product-sum operation means and determined output data on the basis of predetermined nonlinear characteristics.

11. An image processing method comprising the steps of:
inputting a first image signal having a number L1 of gradation levels;
converting the first image signal into a second image signal having a number L2 (<L1) of gradation levels;
storing the second image signal in a storage medium;
converting the second image signal into a third image signal which is restored to an image signal as it was before a conversion processing in said converting step of the first image signal the first converting step of the first image signal includes a step of minimizing a predetermined distortion function upon converting the number of gradation levels;
detecting a motion of the first image signal input in said inputting step on a basis of the third image signal output in said converting step of the second image signal; and
reading out from said storage medium the second image signal corresponding to the first image signal whose motion is detected in said detection step, and supplying the read-out second image signal to display means.

12. An image processing method comprising:
a) an input step of inputting a first image signal having a number L1 of gradation levels;
b) a first conversion step of converting the first image signal into a second image signal having a number L2 (<L1) of gradation levels;
c) a storing step of storing the second image signal in a storage means;
d) a second conversion step of converting the second image signal into a third image signal having a number L1 of gradation levels;
e) a detection step of detecting a motion of the first image signal of one picture on a basis of the third image signal of another picture; and
f) an output step of outputting the second image signal from said storage means in accordance with the output of said detection step, wherein
said first conversion step includes a step of minimizing a predetermined distortion function upon converting the number of gradation levels,
said second conversion step includes a step of converting the second image signal into the third image signal on a basis of a parameter of the distortion function, and
said detection step includes a step of detecting a motion between successive frames by comparing the first image signal and the third image signal.

* * * * *

UNITED STATES PATENT AND TRADEMARK OFFICE
CERTIFICATE OF CORRECTION

PATENT NO. : 6,246,780 B1
DATED : June 12, 2001
INVENTOR(S) : Makoto Sato

It is certified that error appears in the above-identified patent and that said Letters Patent is hereby corrected as shown below:

Column 3,
Line 6, "form" should read -- from --.

Column 5,
Line 54, "(yi, ui)" should read -- $y_i$, $u_i$ --; and
Line 67, "B=X" should read -- B=H --.

Column 6,
Line 65, "an" should read -- $û^n$ --.

Signed and Sealed this

Twelfth Day of March, 2002

Attest:

Attesting Officer

JAMES E. ROGAN
*Director of the United States Patent and Trademark Office*